United States Patent
Strode

(10) Patent No.: US 10,488,210 B2
(45) Date of Patent: *Nov. 26, 2019

(54) PROVIDING AN INSTRUCTION NOTIFICATION FOR NAVIGATION

(71) Applicant: Red Hat, Inc., Raleigh, NC (US)

(72) Inventor: Raymond Strode, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 233 days.

This patent is subject to a terminal disclaimer.

(21) Appl. No.: 15/624,343

(22) Filed: Jun. 15, 2017

(65) Prior Publication Data

US 2017/0284815 A1 Oct. 5, 2017

Related U.S. Application Data

(63) Continuation of application No. 14/565,791, filed on Dec. 10, 2014, now Pat. No. 9,696,173.

(51) Int. Cl.
*G01C 21/34* (2006.01)
*G01C 21/36* (2006.01)

(52) U.S. Cl.
CPC ..... *G01C 21/3415* (2013.01); *G01C 21/3484* (2013.01); *G01C 21/3641* (2013.01)

(58) Field of Classification Search
CPC ............ G01C 21/3415; G01C 21/3484; G01C 21/3641
USPC ....................................................... 701/418
See application file for complete search history.

(56) References Cited

U.S. PATENT DOCUMENTS

| 6,584,401 | B2 | 6/2003 | Kirshenbaum et al. |
| 7,289,904 | B2 | 10/2007 | Uyeki |
| 8,392,116 | B2 | 3/2013 | Lehmann et al. |
| 8,855,925 | B2 | 10/2014 | Emani et al. |
| 9,020,751 | B1 * | 4/2015 | Bogovich ............... G06Q 40/08 701/423 |
| 9,163,951 | B2 * | 10/2015 | Su ....................... G01C 21/3415 |
| 10,168,177 | B2 * | 1/2019 | Hinnegan ........... G01C 21/3697 |
| 2006/0217882 | A1 | 9/2006 | Takashima et al. |

(Continued)

FOREIGN PATENT DOCUMENTS

| EP | 1 503 355 A1 | 2/2005 | |
| EP | 2090970 A1 * | 8/2009 | ......... G06F 3/04817 |

(Continued)

OTHER PUBLICATIONS

Coxworth, Ben; "Ford Developing Biometric Systems to Manage "Driver Workload"", Jul. 3, 2012, 7 pages, http://www.gizmag.com/myford-touch-biometrics/23183/.

(Continued)

*Primary Examiner* — Tuan C To
(74) *Attorney, Agent, or Firm* — Lowenstein Sandler LLP

(57) ABSTRACT

A mechanism for providing an instruction notification for navigation. A method includes receiving destination data of a user device and generating default navigation instruction in view of the destination data. The default navigation instruction provides directions from a first location of the user device to a second location of the destination data. The method also includes setting the user device to a commute mode in view of the destination data. The commute mode includes generating a modified navigation instruction that modifies the default navigation instruction.

20 Claims, 4 Drawing Sheets

(56) References Cited

U.S. PATENT DOCUMENTS

| | | |
|---|---|---|
| 2007/0149214 A1 | 6/2007 | Walsh et al. |
| 2008/0300778 A1 | 12/2008 | Kuznetsov |
| 2009/0105940 A1* | 4/2009 | Bitan ................ G01C 21/3415 |
| | | 701/533 |
| 2009/0119009 A1 | 5/2009 | Dicke |
| 2009/0228196 A1* | 9/2009 | Raab ..................... G01C 21/26 |
| | | 701/532 |
| 2009/0271113 A1 | 10/2009 | Chang et al. |
| 2010/0245561 A1 | 9/2010 | Yamaguchi et al. |
| 2010/0250111 A1 | 9/2010 | Gutierrez et al. |
| 2012/0197839 A1* | 8/2012 | Vervaet ................. G01C 21/32 |
| | | 707/609 |
| 2012/0271545 A1* | 10/2012 | Cheng ..................... G06F 1/169 |
| | | 701/431 |
| 2012/0296565 A1 | 11/2012 | Liu |
| 2013/0247173 A1* | 9/2013 | Jakobsson ............... G06F 21/45 |
| | | 726/18 |
| 2013/0304379 A1 | 11/2013 | Fulger et al. |
| 2013/0325320 A1 | 12/2013 | Dimitriadis |
| 2013/0346408 A1 | 12/2013 | Duarte et al. |
| 2014/0025298 A1* | 1/2014 | Spindler ................ G01C 21/32 |
| | | 701/533 |
| 2014/0129143 A1* | 5/2014 | Dave .................. G01C 21/3407 |
| | | 701/537 |
| 2014/0142849 A1* | 5/2014 | Ziezold .............. G01C 21/3641 |
| | | 701/533 |
| 2014/0236482 A1 | 8/2014 | Dorum et al. |
| 2014/0278070 A1 | 9/2014 | McGavran et al. |
| 2014/0288831 A1 | 9/2014 | Sinton |
| 2014/0324779 A1* | 10/2014 | Forbes .................... G06F 16/27 |
| | | 707/634 |
| 2014/0365122 A1 | 12/2014 | McGavran et al. |
| 2014/0365126 A1 | 12/2014 | Vulcano et al. |
| 2014/0379261 A1* | 12/2014 | Karumuri ............. G01C 21/00 |
| | | 701/540 |
| 2015/0057931 A1* | 2/2015 | Pivonka ............. G01C 21/3484 |
| | | 701/533 |
| 2015/0345981 A1* | 12/2015 | Goldman-Shenhar ...................... |
| | | G01C 21/3629 |
| | | 701/533 |
| 2016/0069706 A1* | 3/2016 | Murphy ............. G01C 21/3476 |
| | | 701/412 |
| 2016/0076896 A1* | 3/2016 | Konig .................... G01C 21/26 |
| | | 701/411 |
| 2016/0076906 A1 | 3/2016 | Hinnegan |
| 2016/0091323 A1* | 3/2016 | MacGougan ...... G01C 21/3697 |
| | | 701/400 |
| 2016/0161275 A1* | 6/2016 | Waltermann ....... G01C 21/3484 |
| | | 701/424 |
| 2018/0094943 A1* | 4/2018 | Grochocki, Jr. ... G01C 21/3492 |

FOREIGN PATENT DOCUMENTS

| | | | | |
|---|---|---|---|---|
| EP | 2 131 150 A1 | 12/2009 | | |
| FR | 2970356 A1 | * 7/2012 | ......... | H04M 1/6075 |
| GB | 2370708 A | * 7/2002 | ......... | G08G 1/0969 |
| KR | 20140002373 | 6/2014 | | |
| WO | WO-2007101744 A1 | * 9/2007 | ......... | G01C 21/3647 |

OTHER PUBLICATIONS

Roider, et al.; "An Individualized Travel Information System for Optimizing Mode and Route Choice behavior of Commuters", 3 pages, http://www.sciencedirect.com/science/article/pii/S1877042812029114 Jan. 1, 2012; 48:1948-57.

Leshed, et al.; "In-Car GPS Navigation: Engagement with and Disengagement from the Environment", Information Science, Cornell University, 10 pages, http://leshed.comm.cornell.edu/pubs/chi1103-leshed.pdf Apr. 2008.

Van Essen, Mariska; "One Route or the Other?" VirginiaTech Transportation Institute; Jun. 24, 2014 Final Report; 143 pages; http://essay.utwente.nl/65801/1/EssenMAvan_01919280_openbaar.pdf.

Brett et al., "Indoor Navigation Using a Mobile Phone," year: 2012, pp. 109-115.

Beatriz et al., "Wiimote as an Input Device in Google Earth Visualization and Navigation: A User Study Comparing Two Alternatives," year: 2010, pp. 473-478.

* cited by examiner

PROVIDING AN INSTRUCTION NOTIFICATION FOR NAVIGATION

RELATED APPLICATIONS

This application is a continuation application of U.S. patent application Ser. No. 14/565,791, filed on Dec. 10, 2014, the entire contents of which is hereby incorporated by reference.

TECHNICAL FIELD

The embodiments of the disclosure relate generally to a computer system and, more specifically, relate to providing an instruction notification for navigation.

BACKGROUND

Currently, navigation systems provide an instruction notification for navigation by presenting step-by-step directions based on rules programmed into the devices. Some advanced versions of navigation systems provide the user with an additional convenience of rerouting the directions based on traffic information. However, these systems provide very frequent step-by-step directions, which are very disruptive to a user, especially when the user is familiar with the route. Furthermore, these step-by-step directions tend to repeatedly interrupt any other applications running on the device providing the navigation.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure are directed to providing an instruction notification for navigation. Embodiments of the disclosure provide a navigation instructions notification component for processing and rendering instruction notifications for navigation to a user device. An instruction notification may include at least one significant direction to a destination. Such significant direction provides a highlight of the daily commuting direction rather than full step-by-step directions.

A method of one embodiment includes receiving destination data of a user device and generating default navigation instruction in view of the destination data. The default navigation instruction provides directions from a first location of a user device to a second location of the destination data. The method also includes setting the user device to a "commute mode" based on the received destination data. The commute mode may include generating a modified navigation instruction. The modified navigation instruction may be a modification of a default navigation instruction generated in view of the destination data. The method also includes providing the modified navigation instruction to the user device when the user device is set to the commute mode.

Prior solutions for providing notification for navigation present several disadvantages. The navigation instructions of prior solutions may include frequent step-by-step directions that are very disruptive to a user, especially when the user is familiar with the route. Furthermore, these step-by-step directions tend to repeatedly-interrupt any application(s) running on a user device providing the notification. Embodiments of the disclosure overcome these disadvantages by providing a modified notification to the navigation. The modified notification may include at least one significant direction to a destination. In addition, the modified notification may prevent the notification of step-by-step directions to the user device as part of the navigation. Accordingly, the embodiments of the disclosure interpret a user's intention provided on a user device. In one embodiment, the user's intention is to reach the destination without disruptions of the step-by-step directions on the user device. In another embodiment, the user's intention is to receive the significant direction that adds value to the route leading to the destination. Also, the embodiments of the disclosure disrupt the user device when the user's intention is deemed suboptimal to a goal of reaching the destination.

Figure 1:
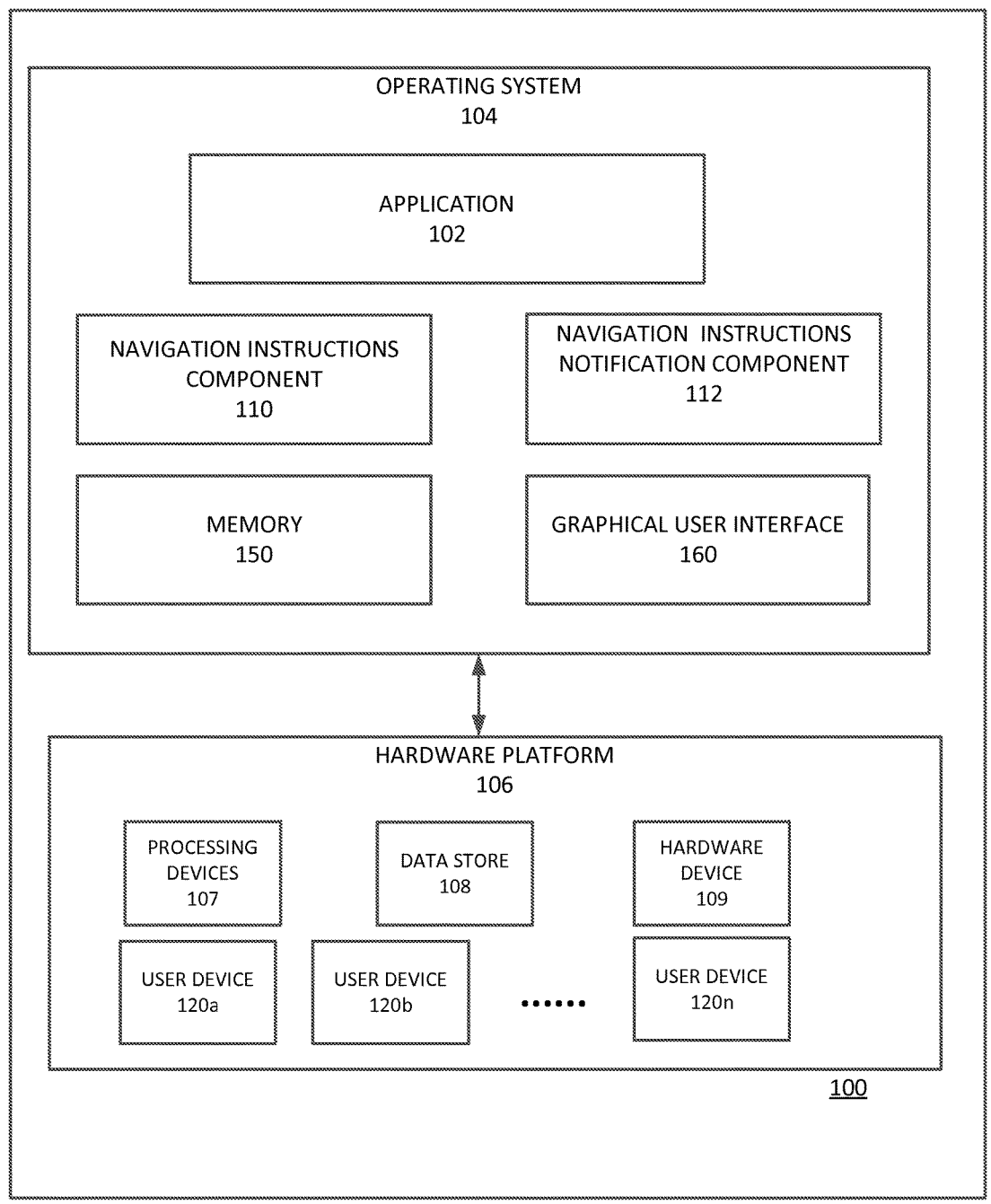
FIG. 1 is a block diagram of a computer system in which the embodiments of the disclosure may operate.

FIG. 1 is a block diagram illustrating a computer system 100 in which embodiments of the present invention may be implemented. In one embodiment, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a mainframe server device or any other type of server device. The computer system 100 comprises a hardware platform 116, on top of which runs an operating system (OS) 104. The OS 104 may include Microsoft™, Linux™, Solaris™, Mac™ OS or any other suitable OS for managing operations on the computer system 100. The OS 304 may also include a memory 150 and a graphical user interface (GUI) 160.

The hardware platform 106 may include one or more processing devices 107 and a data store 108. In one embodiment, the data store 108 comprises one or more hardware or software devices, which may be located internally or externally to the computer system 100. Examples of data store 108 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 109, such as network interface cards (NICs), sound or video adaptors, photo/video cameras, printer devices, keyboards, displays or any other suitable device intended to be coupled to a computer system.

In one embodiment, the hardware platform 106 may include one or more user devices 120a-120n. The user device 120 may be any variety of different computing devices, which include but are not limited to, a laptop computer, a handheld computer, a netbook, a desktop, a workstation, a mobile device such as smart phone, a server device, a tablet computing device, or any other type of computing device.

The computer system 100 may include one or more various software application programs 102 (i.e. applications) executed by the OS 104. The various applications 102 may include any computer-executable program capable of communicating with the OS 104. Some of these applications may include, but are not limited to, voice mail applications, web applications, Microsoft™ applications, an Eclipse integrated development environment (IDE), and/or other applications.

In one embodiment, the OS 104 includes a navigation instructions component 110, which runs an application to generate default navigation instructions for a user. In one embodiment, the application is a global positioning system (GPS)-based application, and in some cases may be referred to as a navigation application or a maps application. The default navigation instructions include step-by-step directions to travel to a destination. In one embodiment, the default navigation instructions are generated based on destination data provided by the user. The default navigation instruction may provide directions from a first location of the user device 120 to a second location of the destination data. For example, the destination data may include, but is not limited to, an address, an intersection, a city, a zip code, a point of interest, and so on. In one embodiment, the default navigation instructions are automatically generated based on a time of day of travel by the user. In one embodiment, the default navigation instructions are automatically generated based on a distance and direction of travel by the user. In one embodiment, the default navigation instructions are stored in the memory 150.

In one embodiment, the OS 104 includes a navigation instruction notification (NIN) component 112 to provide instruction notification for the navigation. Instruction notification includes at least one significant direction to a destination. In one embodiment, the NIN component 112 receives the destination data of the user device 120. Upon receipt of the destination data, the NIN component 112 sets the navigation instructions component 110 to a "commute mode". The commute mode may be a mode in which a user is familiar with the directions provided by the default navigation instruction. In one embodiment, the commute mode includes preventing notification of at least a portion of the default navigation instruction(s) generated for the destination data. In one embodiment, the commute mode includes generating a modified navigation instruction. The modified navigation instruction causes modification of the default navigation instruction(s).

For example, the modified navigation instruction may include at least one significant direction to travel to the destination. The significant direction is different from the step-by-step direction. The navigation instructions component 110 may generate the modified navigation instruction. In one embodiment, the NIN 112 determines whether to notify the modified navigation instruction to the user device 120. In one embodiment, the NIN 112 compares the modified navigation instruction with the default navigation instruction based on parameters. Such parameters include, but are not limited to, time, distance, road condition, user action, user condition etc. In one embodiment, the default navigation instructions are modified in real time.

In one embodiment, the NIN 112 notifies the user device 120 of the modified navigation instruction based on the comparison.

In one example, the NIN component 112 compares the time to travel a distance in the modified navigation instruction with the time to travel the distance in the default navigation instruction. In one scenario, the NIN component 112 determines that the time to travel a distance in the modified navigation instruction is less than the time to travel the distance in the default navigation instruction. The NIN component 112 then notifies the user device 120 of the modified navigation instruction. In one example, such modified navigation instruction may include "Get off on next exit to arrive ten minutes sooner". In another example, such modified navigation instruction may include "Stay on the highway to arrive at destination ten minutes sooner".

In another scenario, the NIN component 112 determines that a user's action with a vehicle, such as changing to a left lane on a highway, as per the default navigation instructions, may cause additional delay. The NIN component 112 then notifies the user device 120 of the modified navigation instruction. In one example, such modified navigation instruction may include "Change to a right lane on the highway to avoid additional delay". In another scenario, the NIN component 112 may be configured to avoid certain road and/or traffic conditions (e.g., gridlock in a specific exit on the highway). If such road and/or traffic conditions are found to occur as part of the default navigation instruction, the NIN component 112 may notify the user device 120 of the modified navigation instruction. In one example, such modified navigation instruction may include "Do not take the specific exit and take the exit few miles later.

In one embodiment, the user is notified of the modified navigation instruction in real time. In one embodiment, a notification of the modified navigation instruction is displayed on a user device 120 via the GUI 160. In another embodiment, a notification of the modified navigation instruction is provided acoustically onto the user device 120 via a loudspeaker (not shown) of the user device 120. In one embodiment, the loud speaker may be part of hardware platform 106.

Figure 2:
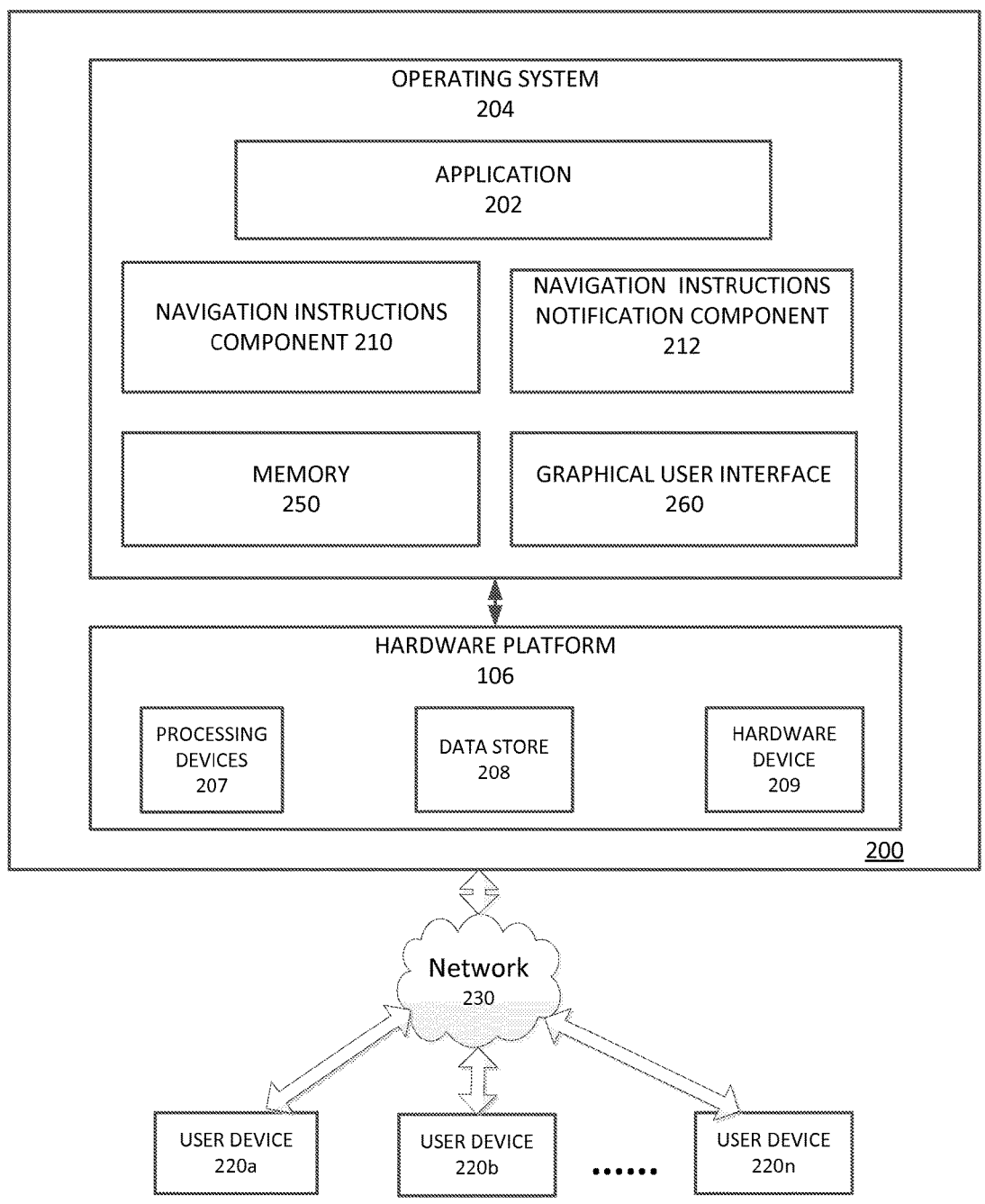
FIG. 2 is a block diagram of a computer system in which the embodiments of the disclosure may operate.

FIG. 2 is a block diagram illustrating a computer system 200 in which embodiments of the present invention may be implemented. The computer system 200 is same as the computer system 100 and the user devices 120a-120n are same as the user devices 220a-220n except in this embodiment, the user devices 220a-220n are e external to the computer system 100 that communicate over a network with the computer system 100. The network may be any type of communication network including, but not limited to, a local area network (LAN), a wide area network (WAN) (e.g., the Internet) or similar communications network. The network can include any number of network devices and computing devices that are in communication over any combination of wired and wireless communication lines.

Figure 3:
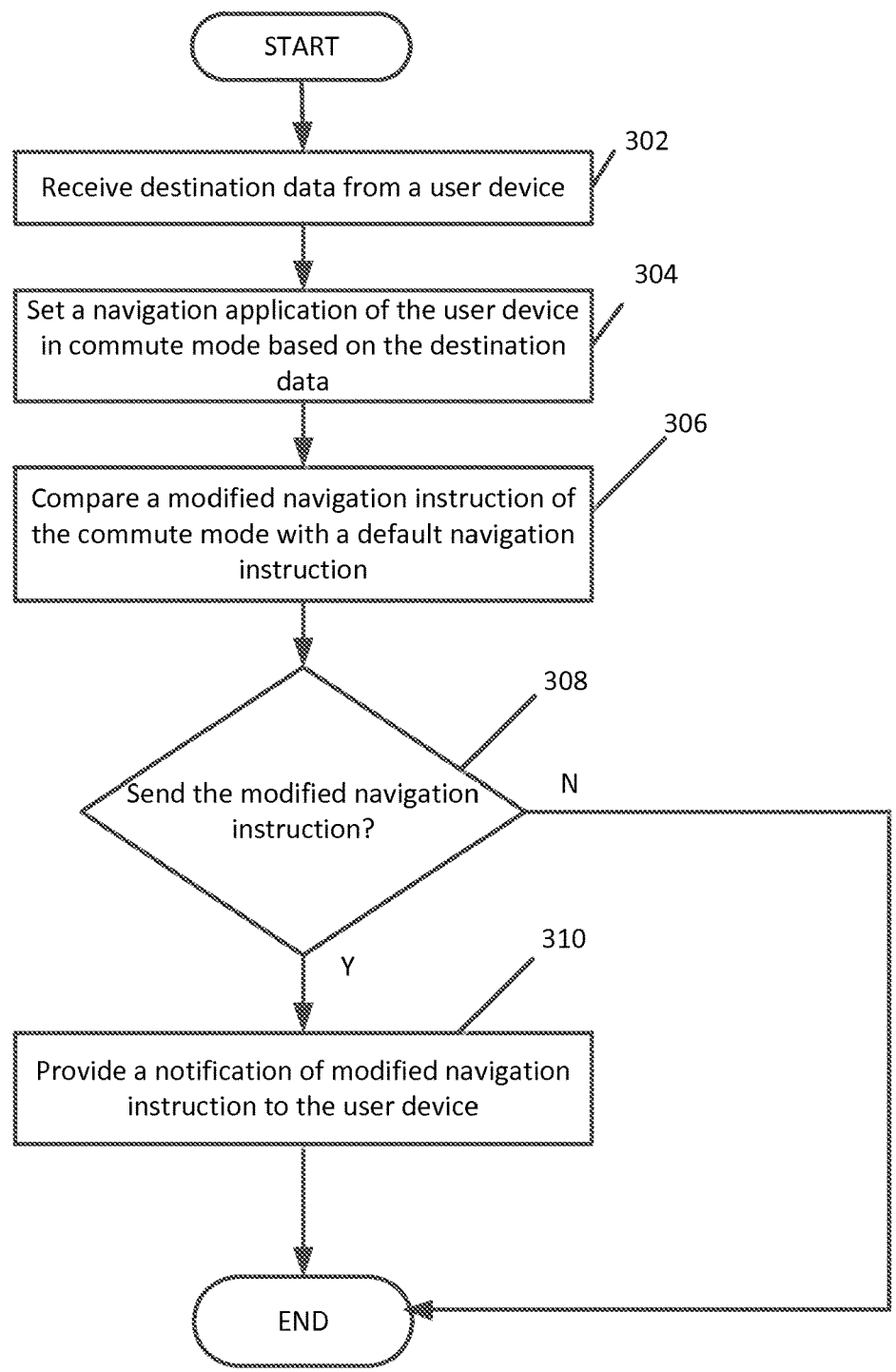
FIG. 3 is a flow diagram of one embodiment of a method for providing instruction notification for navigation.

FIG. 3 is a flow diagram illustrating a method 300 for providing navigation instructions notification according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the NIN component 112 of FIG. 1.

Referring to FIG. 3, method 300 begins at block 302 where destination data is received from a user device. At block 304, a navigation application of the user device is set to a commute mode based on the destination data. The commute mode may be a mode in which a user is familiar with the directions provided by the default navigation instruction. In one embodiment, the commute mode includes preventing notification of at least a portion of the default navigation instruction(s) generated for the destination data. The default navigation instruction includes step-by-step directions to travel to the destination. In one embodiment, the default navigation instructions are generated based on the destination data provided by the user. The default navigation instruction may provide directions from a first location of the user device 120 to a second location of the destination data. For example, the destination data may include, but is not limited to, an address, an intersection, a city, a zip code, a point of interest, and so on. In one embodiment, the default navigation instructions are automatically generated based on time of day of travel by the user. Also, as discussed above, in one embodiment, the default navigation instructions are automatically generated based on a distance and direction of travel by the user.

In one embodiment, the commute mode includes generating a modified navigation instruction. As discussed above, modified navigation instruction causes modification of a default navigation instruction. For example, the modified navigation instruction includes at least one significant direction to travel to the destination. The significant direction is different from the step-by-step direction provided in the default navigation instruction.

At block 306, compare the modified navigation instruction of the commute mode with the default navigation instruction. Also, as discussed above, the comparison is determined based on parameters. Such parameters include, but are not limited to, time, distance, road condition, user action, user condition etc. In one example, the time to travel a distance in the modified navigation instruction is compared with the time to travel the distance in the default navigation instruction. In one embodiment, the default navigation instructions are modified in real time. At block 308, determine whether to send the modified navigation instruction to the user device. This determination is made based on the comparison. At block 310, a notification of the modified navigation instruction is provided to the user device when it is determined at block 308 to send the modified navigation instruction. In one embodiment, a notification of the modified navigation instruction is displayed on the user device via a GUI, such as GUI 160. In another embodiment, a notification of the modified navigation instruction notification is provided acoustically onto a user device via a loudspeaker.

In one embodiment, the default destination instruction is not sent to the user device. In one embodiment, the modified navigation instruction is sent in place of the default destination instruction.

Figure 4:
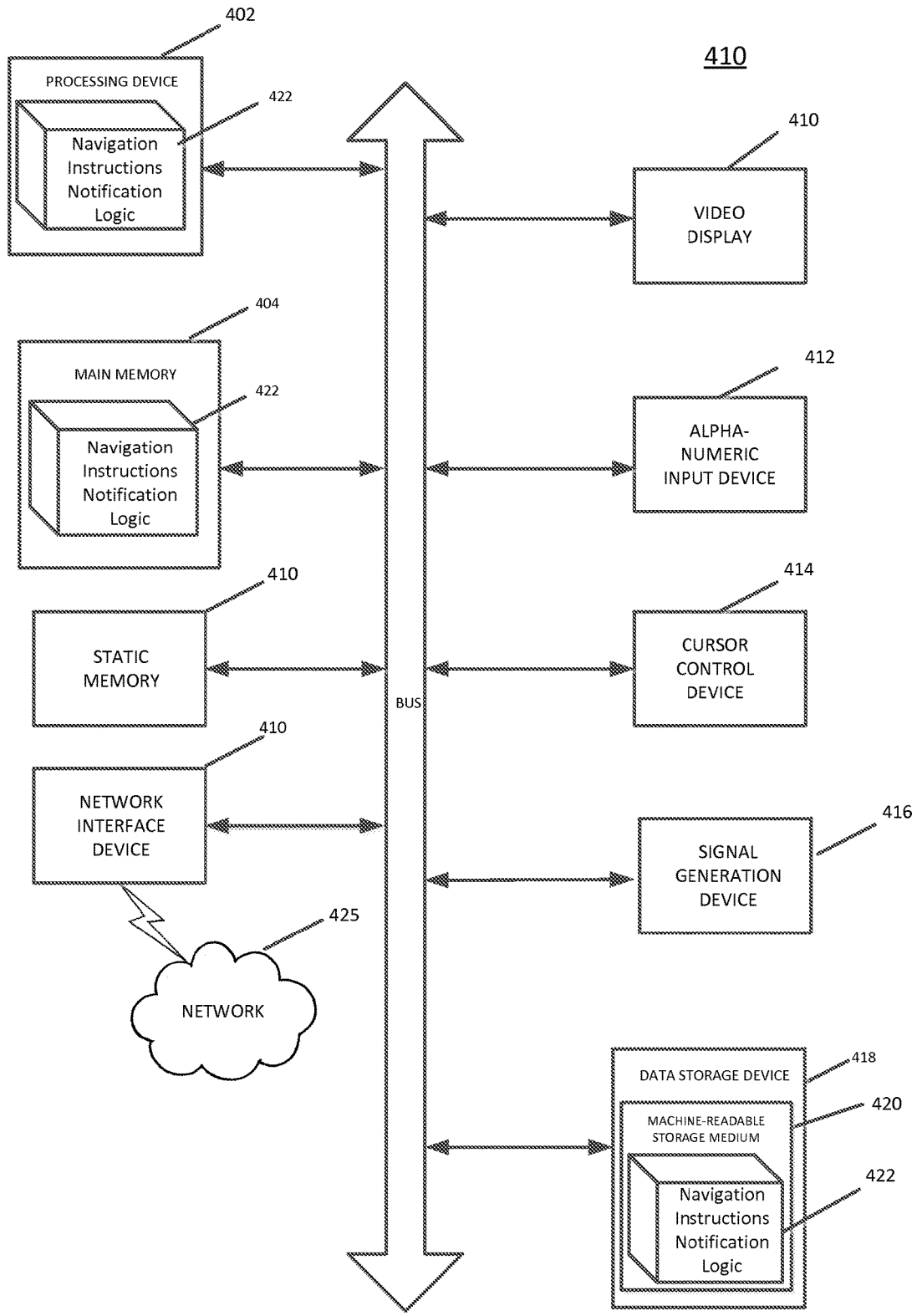
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute navigation instruction notification logic 422 for performing the operations and steps discussed herein. In one embodiment, navigation instruction notification component 112 described with respect to FIG. 1 performs the navigation instruction notification logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. navigation instructions notification logic 422) embodying any one or more of the methodologies of functions described herein. The navigation instructions notification logic 422 may also reside, completely or at least partially, within the memory 406 and/or within the processing device 402 during execution thereof by the computer system 400; the memory 406 and the processing device 402 constituting machine-accessible storage media. In one embodiment, navigation instructions notification logic 422 is the same as the navigation instructions notification component 112 of FIG. 1.

The machine-readable storage medium 420 may also be used to store the message notification processing logic 422 persistently containing methods that call the above applications. While the machine-readable storage medium 420 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions, which follow, are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "storing", "setting", "comparing", "generating", "preventing", "notifying", "modifying", "rendering", "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
setting, by a processing device, a commute mode associated with a user device in view of destination data, wherein the commute mode comprises generating a modified navigation instruction that modifies a default navigation instruction, wherein the default navigation instruction provides directions from a first location of the user device to a second location identified by the destination data;
comparing the modified navigation instruction with the default navigation instruction in view of a parameter; and
providing the modified navigation instruction in view of the comparison.

2. The method of claim 1, further comprising:
generating the default navigation instruction in view of the destination data.

3. The method of claim 2, wherein the default navigation instruction is generated in view of a direction of travel by the user device and a distance from the first location to the second location identified by the destination data.

4. The method of claim 1, further comprising:
determining whether to provide the modified navigation instruction to the user device based on the comparison, wherein the modified navigation instruction is provided in view of the determination.

5. The method of claim 1, wherein the default navigation instruction comprises step-by-step directions from the first location of the user device to the second location.

6. The method of claim 5, wherein the modified navigation instruction comprises at least one significant direction from the first location of the user device to the second location of the user device, wherein the at least one significant direction is different from the step-by-step directions.

7. The method of claim 1 wherein the commute mode prevents notification of the default navigation instruction.

8. The method of claim 1, wherein the parameter comprises at least one of a time, a distance, a road condition, a user condition, or a user action.

9. The method of claim 8, wherein comparing the modified navigation instruction with the default navigation instruction in view of the parameter comprises comparing a parameter associated with the modified navigation instruction with a parameter associated with the default navigation instruction.

10. The method of claim 1, wherein the providing comprising displaying a notification of the modified navigation instruction on the user device.

11. A system comprising:
a memory; and
a processing device, operatively coupled to the memory, the processing device to:
set a commute mode associated with a user device in view of destination data, wherein the commute mode comprises generating a modified navigation instruction that modifies a default navigation instruction, wherein the default navigation instruction provides directions from a first location of the user device to a second location identified by the destination data;
compare the modified navigation instruction with the default navigation instruction in view of a parameter; and
provide the modified navigation instruction in view of the comparison.

12. The system of claim 11, the processing device further to:
generate the default navigation instruction in view of the destination data.

13. The system of claim 12, wherein the default navigation instruction is generated in view of a direction of travel by the user device and a distance from the first location to the second location identified by the destination data.

14. The system of claim 11, the processing device further to:
determine whether to provide the modified navigation instruction to the user device based on the comparison, wherein the modified navigation instruction is provided in view of the determination.

15. The system of claim 11, wherein the default navigation instruction comprises step-by-step directions from the first location of the user device to the second location.

16. The system of claim 11, wherein the parameter comprises at least one of a time, a distance, a road condition, a user condition and a user action.

17. A non-transitory computer-readable storage medium that provides instructions that, when executed by a processing device, cause the processing device to:
set a commute mode associated with a user device in view of destination data, wherein the commute mode comprises generating a modified navigation instruction that modifies a default navigation instruction, wherein the default navigation instruction provides directions from a first location of the user device to a second location identified by the destination data;
compare the modified navigation instruction with the default navigation instruction in view of a parameter; and
provide the modified navigation instruction in view of the comparison.

18. The non-transitory computer-readable storage medium of claim 17, the processing device further to:
generate the default navigation instruction in view a direction of travel by the user device and a distance from the first location to the second location identified by the destination data.

19. The non-transitory computer-readable storage medium of claim 17, the processing device further to:
determine whether to provide the modified navigation instruction to the user device based on the comparison, wherein the modified navigation instruction is provided in view of the determination.

20. The non-transitory computer-readable storage medium of claim 17, wherein the default navigation instruction comprises step-by-step directions from the first location of the user device to the second location.

* * * * *